United States Patent
Reddy et al.

(10) Patent No.: US 12,463,860 B2
(45) Date of Patent: Nov. 4, 2025

(54) OPTIMAL FAULT MANAGEMENT REPORTING VIA NF LEVEL NORTHBOUND FAULT REPORTING AGENT

(71) Applicant: Rakuten Symphony, Inc., Tokyo (JP)

(72) Inventors: Virendra Reddy, Bangalore (IN); Prasaanth Gowravalli, Bangalore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 18/018,055

(22) PCT Filed: Dec. 23, 2022

(86) PCT No.: PCT/US2022/053942
§ 371 (c)(1),
(2) Date: Jan. 26, 2023

(87) PCT Pub. No.: WO2024/136874
PCT Pub. Date: Jun. 27, 2024

(65) Prior Publication Data
US 2024/0250864 A1    Jul. 25, 2024

(51) Int. Cl.
*H04L 41/0631*    (2022.01)
*H04L 41/069*    (2022.01)

(52) U.S. Cl.
CPC ........ *H04L 41/0631* (2013.01); *H04L 41/069* (2013.01)

(58) Field of Classification Search
CPC .......................... H04L 41/0631; H04L 41/069
See application file for complete search history.

(56) References Cited

U.S. PATENT DOCUMENTS

| | | | |
|---|---|---|---|
| 11,483,218 B2 | 10/2022 | Al-Dulaimi et al. | |
| 11,582,327 B1 | 2/2023 | Cifuentes de la Paz et al. | |
| 11,751,056 B2 | 9/2023 | Russell | |
| 11,818,570 B2 | 11/2023 | Rajput et al. | |
| 11,880,419 B2 | 1/2024 | Libby et al. | |

(Continued)

FOREIGN PATENT DOCUMENTS

| | | |
|---|---|---|
| WO | 2022069033 A1 | 4/2022 |
| WO | 2022/182396 A1 | 9/2022 |

(Continued)

OTHER PUBLICATIONS

International Search Report (PCT/ISA/210) dated Apr. 7, 2023 issued by the International Searching Authority in application No. PCT/US 22/53942.

(Continued)

*Primary Examiner* — Nazia Naoreen
(74) *Attorney, Agent, or Firm* — Sughrue Mion, PLLC

(57) ABSTRACT

Provided are a method, computer readable medium, and system for reporting data to a Northbound Management System (NBMS) via a Network Function (NF) level Northbound Fault reporting Microservice (MS) in an NF of a Radio Access Network (RAN). The method includes: receiving, by a Fault Management (FM) MS from at least one other MS of the NF, events data; processing, by the FM MS, the events data; obtaining, by the Fault reporting MS, the processed data; and reporting, from the Fault reporting MS to the NBMS, the processed data.

20 Claims, 8 Drawing Sheets

(56) References Cited

U.S. PATENT DOCUMENTS

| | | |
|---|---|---|
| 2006/0244585 A1 | 11/2006 | Bishop et al. |
| 2011/0191373 A1 | 8/2011 | Botros et al. |
| 2012/0124195 A1 | 5/2012 | Bird |
| 2014/0136906 A1 | 5/2014 | Power et al. |
| 2014/0298350 A1 | 10/2014 | Kimata |
| 2015/0378845 A1 | 12/2015 | Shang et al. |
| 2018/0367373 A1 | 12/2018 | Chou |
| 2019/0102717 A1 | 4/2019 | Wu et al. |
| 2020/0028761 A1 | 1/2020 | Holness |
| 2020/0092160 A1 | 3/2020 | Yoon |
| 2020/0322235 A1 | 10/2020 | Bothe et al. |
| 2021/0014113 A1 | 1/2021 | Guim Bernat et al. |
| 2021/0021494 A1 | 1/2021 | Yao et al. |
| 2021/0022024 A1* | 1/2021 | Yao ................. H04W 24/08 |
| 2021/0111942 A1 | 4/2021 | Tahhan et al. |
| 2022/0012608 A1 | 1/2022 | Lehmann |
| 2022/0038902 A1 | 2/2022 | Mueck |
| 2022/0109741 A1 | 4/2022 | Chen et al. |
| 2022/0167236 A1 | 5/2022 | Melodia et al. |
| 2022/0231929 A1 | 7/2022 | Li et al. |
| 2022/0358730 A1 | 11/2022 | Otsuki et al. |
| 2022/0407820 A1 | 12/2022 | Kempanna et al. |
| 2023/0043784 A1 | 2/2023 | Chandrasekaran et al. |
| 2023/0336239 A1 | 10/2023 | Schmidt et al. |
| 2023/0337019 A1 | 10/2023 | Mehta et al. |
| 2023/0388203 A1 | 11/2023 | Bothe et al. |
| 2024/0095101 A1* | 3/2024 | Patro ................... G06F 11/3006 |
| 2024/0179079 A1* | 5/2024 | Mullally ............. H04L 41/5054 |
| 2024/0259253 A1 | 8/2024 | Reddy et al. |

FOREIGN PATENT DOCUMENTS

| | | |
|---|---|---|
| WO | 2023/042142 A1 | 3/2023 |
| WO | 2024/046588 A1 | 3/2024 |

OTHER PUBLICATIONS

Written Opinion (PCT/ISA/237) dated Apr. 7, 2023 issued by the International Searching Authority in application No. PCT/US 22/53942.

\* cited by examiner

OPTIMAL FAULT MANAGEMENT REPORTING VIA NF LEVEL NORTHBOUND FAULT REPORTING AGENT

CROSS REFERENCE TO RELATED APPLICATIONS

This application is a National Stage of International Application No. PCT/US2022/053942, filed Dec. 23, 2022.

FIELD

Systems and methods consistent with example embodiments of the present disclosure relate to fault management reporting via network function level northbound Fault Reporting agent.

BACKGROUND

A radio access network (RAN) is an important component in a telecommunications system, as it connects end-user devices (or user equipment) to other parts of the network. The RAN includes a combination of various network elements (NEs) that connect the end-user devices to a core network. Traditionally, hardware and/or software of a particular RAN is vendor specific.

Recently, the evolution of telco technologies enables many telco services to be realized virtually in the form of software. For instance, RANs such as Open RAN (O-RAN) architectures, disaggregate one network component into multiple functional elements. By way of example, a baseband unit (BBU) or base station (i.e., eNB or gNB) is disaggregated into a number of functional elements including a distributed unit (DU) and a centralized unit (CU), wherein the CU can be further disaggregated into Centralized Unit-Control Plane (CU-CP) and Centralized Unit-User Plane (CU-UP). The disaggregation of network elements enables the telco services and the associated functions to be defined and provided in software-based form or virtual network services, such as Virtualized Network Functions (VNFs), Cloud-native Network Functions (CNFs) or Software Defined Networking (SDN), among others.

FIG. 1 illustrates a related art O-RAN architecture. Referring to FIG. 1, RAN functions in the O-RAN architecture are controlled and optimized by a RIC. The RIC is a software-defined component that implements modular applications to facilitate the multivendor operability required in the O-RAN system, as well as to automate and optimize RAN operations. The RIC is divided into two types: a non-real-time RIC (Non-RT RIC) and a near-real-time RIC (Near-RT RIC).

The Non-RT RIC is the control point of a non-real-time control loop and operates on a timescale greater than 1 second within the Service Management and Orchestration (SMO) framework. Its functionalities are implemented through modular applications called rApps (rApp 1, . . . , rApp N), and include: providing policy based guidance and enrichment across the A1 interface, which is the interface that enables communication between the Non-RT RIC and the Near-RT RIC; performing data analytics; Artificial Intelligence/Machine Learning (AI/ML) training and inference for RAN optimization; and/or recommending configuration management actions over the O1 interface, which is the interface that connects the SMO to RAN managed elements (e.g., Near-RT RIC, O-RAN centralized Unit (O-CU), O-RAN Distributed Unit (O-DU), etc.).

The SMO framework manages and orchestrates RAN elements. Specifically, the SMO includes a Federated O-Cloud Orchestration and Management (FOCOM), a Network Function Orchestrator (NFO) that manages Virtual Machines (VM) based VNF and container (i.e., instance) based VNF, and the OAM as a part of the SMO that manages and orchestrates what is referred to as the O-Ran Cloud (O-Cloud).

Further, the SMO may include an operational support system (OSS) and an element management system (EMS), each of which is configurable to perform one or more of: fault management operation, configuration management operation, account management operation, performance management operation, and security management operation (FCAPS operations), on one or more services hosted or deployed in the servers. In some embodiments, the service management system may include a plurality of EMSs, each of the plurality of EMSs may be configured to manage a single service or a group of services associated with a particular vendor/service provider, and the OSS interfaces between the monitoring system, orchestrator, and the plurality of EMSs. Accordingly, the SMO may provide a single control point for managing a plurality of services (associated with multiple vendors/network service providers) via only one monitoring system and one orchestrator system (i.e., one monitoring system and one orchestrator system can be utilized to manage services associated with multiple vendors/service providers).

In the related art 5G architecture (O-RAN based), functionalities or subsystems in a Network Function (NF) may be implemented as microservices. For example, radio unit (RU) manager is a microservice which handles the DU<->RU related transactions. Baseband microservice implements the layer-1 and layer-2 of the 5G stack. FCAPS microservices is a set of microservices which handle aspects of the system like Fault Management, Configuration Management and Performance Management of the gNodeB network function (gNB NF).

Fault Management microservice (FM MS) is responsible for collecting various events related to the functionality aspects (e.g. faults, error conditions, etc.) of the 5G O-RAN subsystems (such as those described above) within an NF. FM MS may collect the various fault events, e.g., cell down, FIC link down, timing locked etc., from various microservices present in the gNB NF. FM MS then reports those events immediately to a Northbound Management System (NBMS) for triggering any post-processing or corrective measures.

Performance Management microservice (PM MS) is responsible for collecting various statistics and counters related to performance aspects of the 5G O-RAN subsystems. It then reports the performance statistics, e.g., throughput, active users, cell uptime, etc., after enriching the data to the NBMS at predefined regular intervals, e.g., every 1 minute, 15 minutes etc. PM MS then reports those statistics to a Northbound management system (NBMS) for triggering any post-processing or corrective measures.

Further, FM MS handles the fault management events that are related to functionality aspects. The FM MS, based on predefined conditions, sends notifications and event reports to the Northbound Management System (NBMS). The NBMS, based on the notification reports, may create an alarm and consequently, initiates a triggering procedure for post processing or corrective measures that are associated with the alarm.

FIG. 2 is a block diagram of a communication flow of a FM MS 220 and a NBMS 210 in the related art. Referring to FIG. 2, the related approach is to have the FM MS 220 receive, store (in persistence layer 240), process, and transmit to the NBMS 210 (e.g., EMS and/or OSS) the events data received from microservices 250-1, 250-2, ..., 250-$n$ (e.g., microservices implementing various subsystems as described above of the NF) based on predetermined criteria. The FM MS 220 includes a fault reporting agent 224 that is responsible for reporting the processed data to the NBMS.

FIG. 3 is a block diagram of components of a Fault Management microservice (FM MS) 320 implemented in an NF. Referring to FIG. 3, the FM MS 320 may include: event collection agent 321 for receiving event data (e.g., fault-related event data) from subsystems (i.e., microservices) in the NF; persistence agent 322 for storing the received event data (in either or both of raw data form as received or enriched/encoded form as processed by the FM MS 320) in a storage (e.g., persistence layer or storage); event data enrichment & encoding agent 323 for enriching and encoding the received event data (raw data); and fault reporting agent 324 for reporting the enriched and encoded event data to the NBMS 210.

In the CNF-based 5G O-RAN implementation, FM MS handles events collection, events data enrichment and encoding and events reporting logics. Events reporting logic (or agent) reports the FM data to the NBMS using the management network interface. Core issues such as any software related crashes, restarts, etc., may impact the reporting agent, thereby impacting the ongoing reporting and/or its retry mechanism. Further, in the related art, there may be upper limits on the number of retry counts allowed to limit the resources needs such CPU, memory, storage, etc., of the overall FM MS. To this end, the core logic of FM MS and the reporting agent logics cannot be independently managed with respect to high availability, load balancing, etc. Hence, high availability, load balancing, etc., features that deploy or spawn additional instances of FM MS also deploy additional instances of the reporting agent logic that is included within the FM MS, thereby requiring more resources, more Internet Protocol (IP) addresses than needed, etc., per Network Function. Adding new or updating transport mechanisms (e.g., O1 support, HTTP/REST, Kafka, SNMP, etc.) for fault management also requires updating the FM MS (and each instance thereof). Therefore, there is a need for an improved event notifications data delivery to NBMS with improved retry mechanism.

SUMMARY

According to one or more embodiments, apparatuses and methods are provided for independently managing the fault reporting functionalities of the FM MS. In particular, according to one or more embodiments, there is provided a separate fault reporting microservice in the NF to implement the fault reporting of event from one or more instances of FM MS in the NF. Accordingly, the core logic of the FM MS and issues thereof do not impact the reporting agent (including ongoing reporting and/or retry mechanisms). Further, the core logic of FM MS and the reporting MS according to one or more embodiments can be independently managed with respect to high availability, load balancing, etc., and can be implemented with more fine grained control. As a result, high availability and load balancing features will not mandate more IP addresses than needed, etc., and adding new or updating transport mechanisms involves updating only the reporting MS with the FM MS unchanged.

According to at least one embodiment, a method of reporting data to a Northbound Management System (NBMS) via a Network Function (NF) level northbound Fault reporting Microservice (MS) in an NF of a Radio Access Network (RAN), performed by at least one processor implementing the NF, includes: receiving, by a Fault Management (FM) MS from at least one other MS of the NF, events data; processing, by the FM MS, the events data; obtaining, by the Fault reporting MS, the processed data; and reporting, from the Fault reporting MS to the NBMS, the processed data.

According to at least one embodiment, a system for reporting data to a Northbound Management System (NBMS) via a Network Function (NF) level Northbound Fault reporting Microservice (MS) in an NF of a RAN, the system includes: at least one memory storing instructions; and at least one processor configured to execute the instructions to: receive, by a Fault Management (FM) MS from at least one other MS of the NF, events data; process, by the FM MS, the events data, obtain, by the Fault reporting MS, the processed data; and report, from the Fault reporting MS to the NBMS, the processed data.

According to at least one embodiment, a non-transitory computer-readable recording medium has recorded thereon instructions executable by at least one processor to perform a method for reporting data to a Northbound Management System (NBMS) via a Network Function (NF) level Fault reporting MS in an NF of a RAN, the method includes: receiving, by a Fault Management (FM) MS from at least one other MS of the NF, events data; processing, by the FM MS, the events data; obtaining, by the Fault reporting MS, the processed data; and reporting, from the Fault reporting MS to the NBMS, the processed data.

Additional aspects will be set forth in part in the description that follows and, in part, will be apparent from the description, or may be realized by practice of the presented embodiments of the disclosure.

BRIEF DESCRIPTION OF THE DRAWINGS

Features, aspects and advantages of certain exemplary embodiments of the disclosure will be described below with reference to the accompanying drawings, in which like reference numerals denote like elements, and wherein.

DETAILED DESCRIPTION

Figure 1:
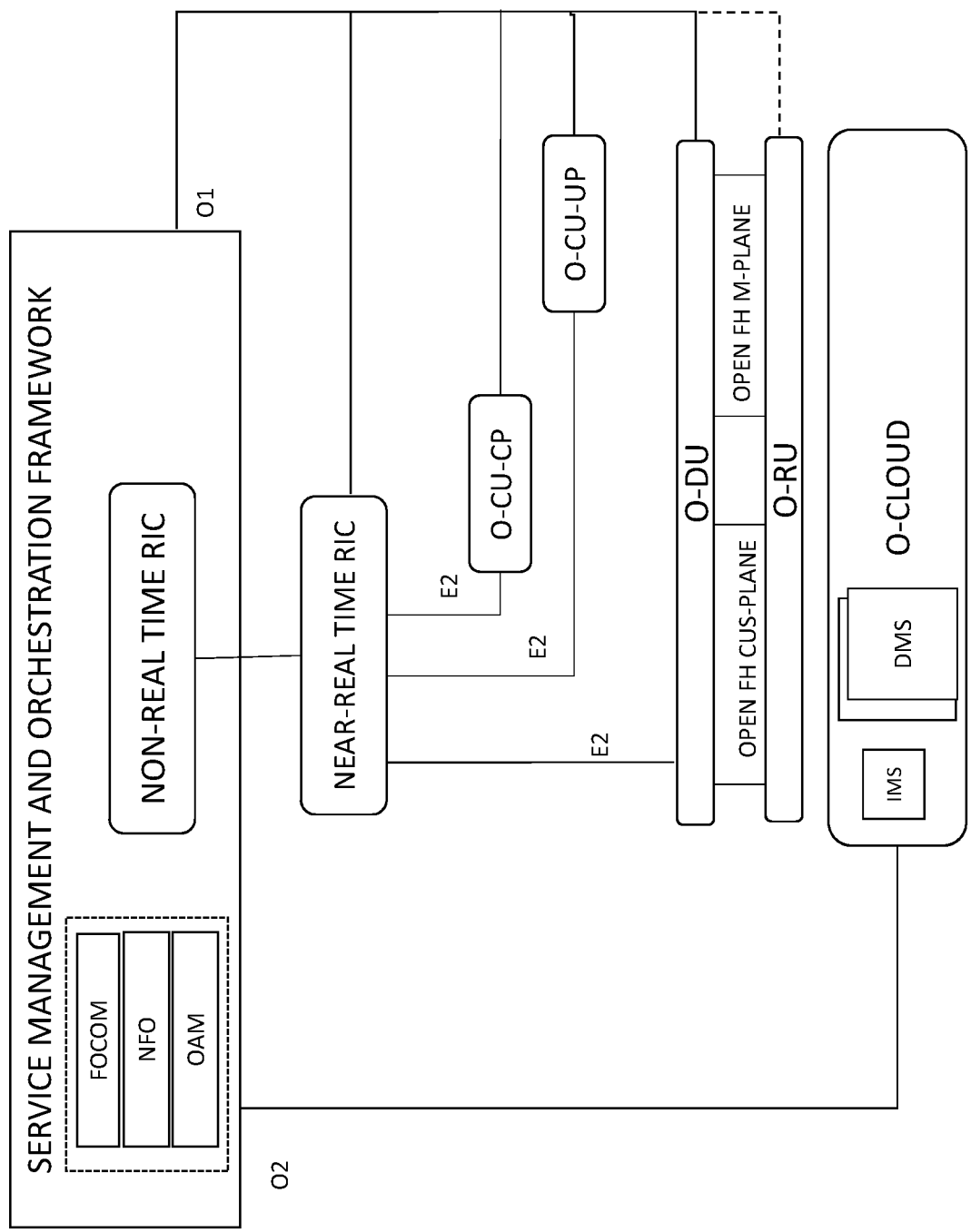
FIG. 1 illustrates an O-RAN architecture according to the related art.

The following detailed description of example embodiments refers to the accompanying drawings.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Furthermore, the described features, advantages, and characteristics of the present disclosure may be combined in any suitable manner in one or more embodiments. One skilled in the relevant art will recognize, in light of the description herein, that the present disclosure can be practiced without one or more of the specific features or advantages of a particular embodiment. In other instances, additional features and advantages may be recognized in certain embodiments that may not be present in all embodiments of the present disclosure.

Example embodiments of the present disclosure provide a method and system for optimal fault management reporting via a Network Function (NF) level northbound Fault reporting microservice (MS). Particularly, example embodiments provide a separate Fault reporting MS, separate from a Fault Management microservice (FM MS), to report events data from the FM MS. Accordingly, the core logic of the FM MS and Fault reporting MS according to example embodiments may be independently managed with respect to high availability, load balancing, etc. Additionally, core FM MS issues will not impact the Fault reporting MS, and any ongoing reporting and/or retry mechanisms. Further, by separating the fault reporting agent and implementing it as an independent NF level MS, resource limits can be independently applied, and it becomes possible to increase a retry count or duration limit until reporting data is successfully delivered northbound. Also, because the fault reporting agent is separated, adding new or updating transport mechanisms (e.g., O1 support, HTTP/REST, Kafka, SNMP, etc.) for fault management data involves only the reporting MS and does not require changes to the FM MS.

Figure 4:
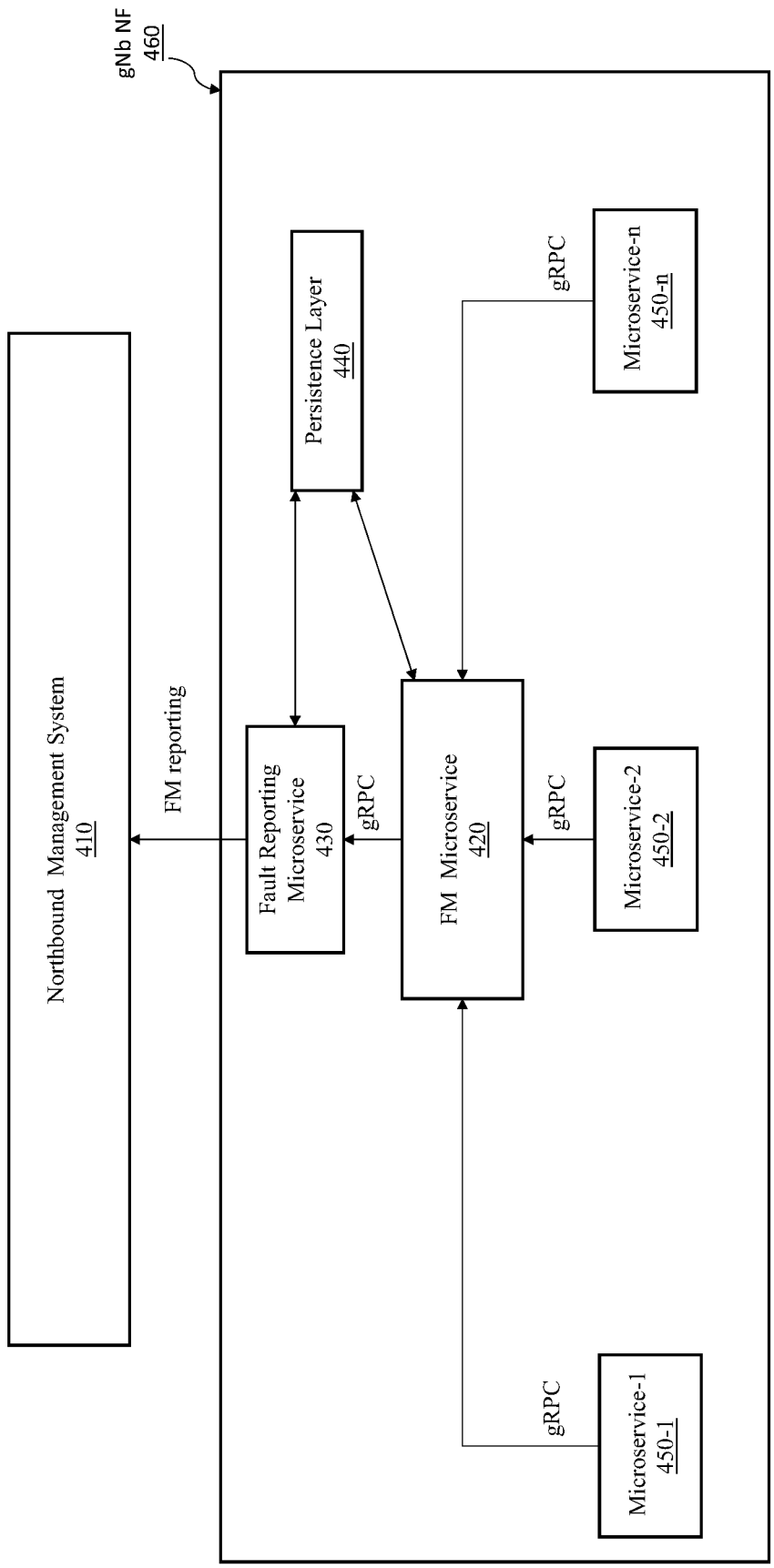
FIG. 4 is a is a block diagram of a communication flow of FM microservice and NBMS, according to an embodiment.

FIG. 4 is a block diagram of a communication flow of a Network Function (NF) 460 (e.g., CU, DU, etc.) for optimal fault management reporting via an NF level northbound Fault reporting microservice 430 for reporting data from FM MS 420, according to an example embodiment. In particular, FIG. 4 illustrates a system for optimal fault management reporting using an independent Fault reporting MS 430, independent from the FM MS 420 for reporting events data, received by the FM MS 420 from various other microservices 450-1, 450-2

Referring to FIG. 4, the Fault reporting microservice (MS) 430, according to an example embodiment is configured to perform the reporting functionality of the related art FM MS (e.g., transmit enriched and encoded data to the NBMS 410). As the Fault reporting MS 430 is independent of the FM MS 420, it has its own separate reporting connectivity towards the NBMS 410. As a result, core FM MS 420 issues do not impact the reporting agent (e.g., ongoing reporting and/or retry mechansims) and resources can be more finely controlled and allocated to the respective microservices.

Figure 2:
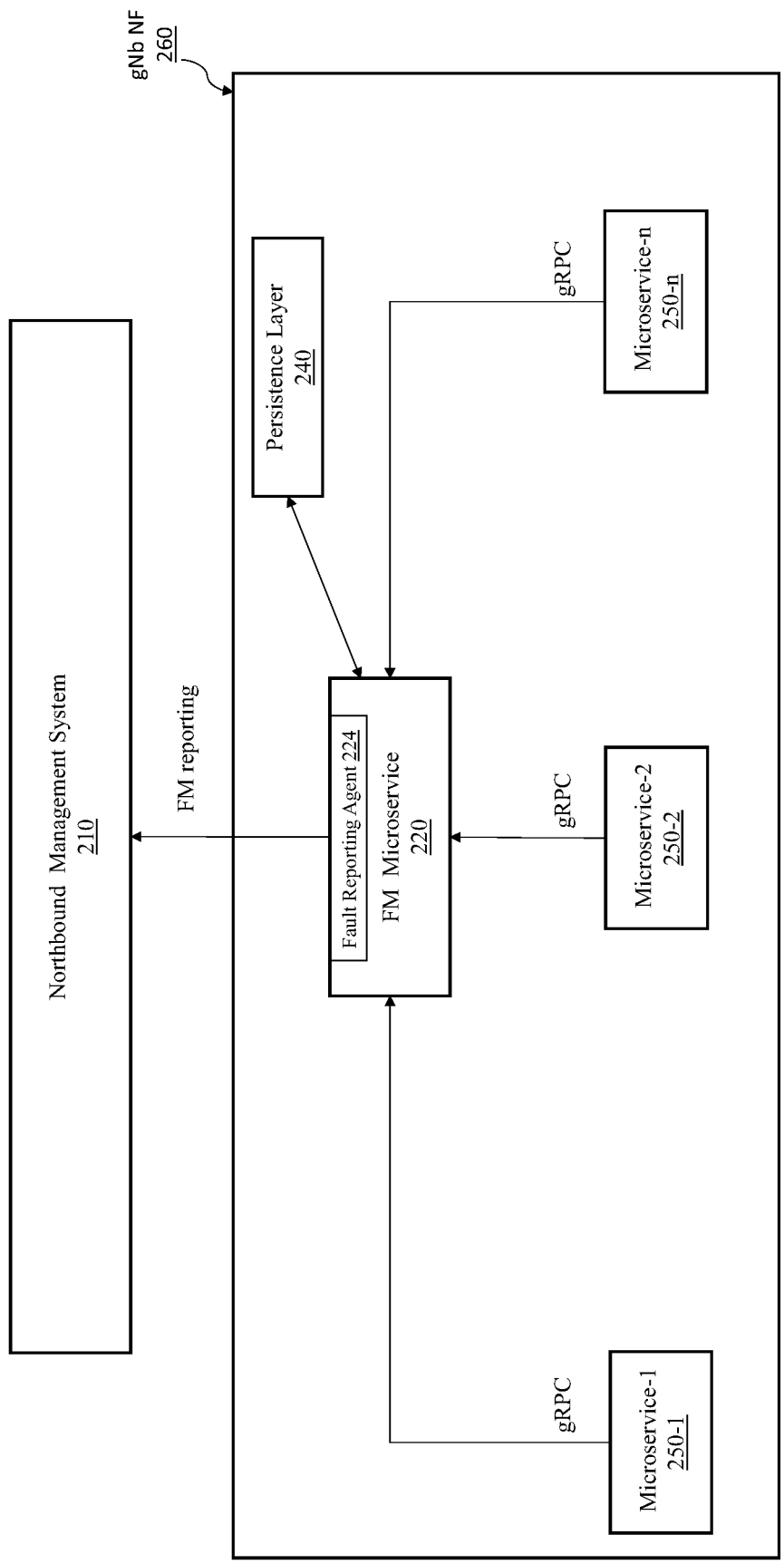
FIG. 2 is a block diagram of a communication flow of Fault Management microservice (FM MS) and a Northbound management system (NBMS) in the related art.
Figure 3:
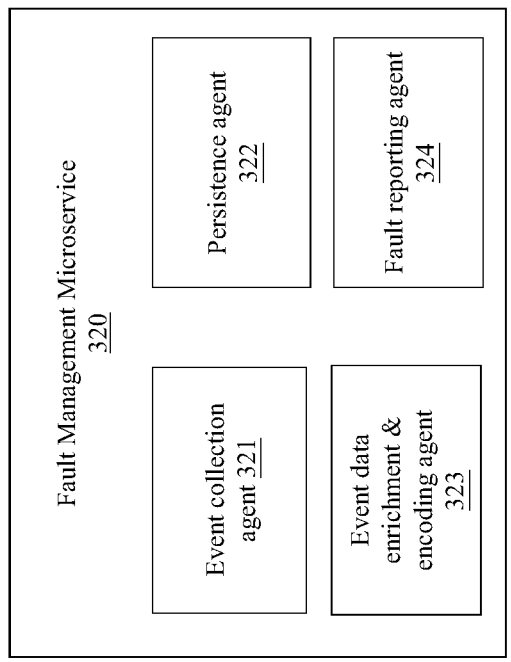
FIG. 3 is a block diagram of components of FM microservice implemented in an NF.

The Fault reporting MS 430 according to one or more example embodiments receives and reports events data processed by the FM MS 420. As described above with reference to FIGS. 1 through 3, the FM MS 420 receives raw event data from one or more other microservices 450-1, 450-2, . . . , 450-n, may store the raw data in the persistence layer 440, enriches and encodes the raw data for northbound reporting, and may store the enriched and encoded event data in the persistence layer 440.

The encoded event data is reported to the NBMS 410 by the Fault reporting MS 430. According to an embodiment, the Fault reporting MS 430 may obtain the encoded data from the persistence layer 440. For example, upon storing the encoded data in the persistence layer 440, the FM MS 420 may signal or inform the Fault reporting MS 430 that the encoded data is stored in the persistence layer 440 and/or is ready for reporting. According to another embodiment, the FM MS 420 may directly provide the encoded event data to the Fault reporting MS 430. In this case, the FM MS 420 may additionally store the encoded data in the persistence layer 440, or the Fault reporting MS 430 may store, in the persistence layer 440, the encoded data received from the FM MS 420.

The Fault reporting MS 430 is an NF level MS, and provides reporting functionality for one or more instances of FM MS 420. Additionally, the Fault reporting MS 430 may be scaled up, i.e., additional instances may be spawned, based on load. High availability and load balancing of the Fault reporting MS 430 may be independently controlled or managed, independent of the FM MS 420, as it is a separate MS.

The Fault reporting MS 430 may report the events data to the NBMS 410 (e.g., EMS and/or OSS) through an O1 interface (e.g., management interface). The NBMS 410 may then perform post-processing, reporting, or corrective actions with respect to the data. By way of example, the NBMS 410 may implement a Kafka cluster to collect at least one of FM event data. Kafka is an open-source system that provides a unified, high-throughput, low-latency platform for handling real-time data feeds. Kafka can connect to external systems (for data import/export) via Kafka Connect, and provides the Kafka Streams libraries for stream processing applications. Kafka uses a binary TCP-based protocol that is optimized for efficiency and relies on a "message set" abstraction that naturally groups messages together to reduce the overhead of the network roundtrip. While Kafka may be used in some embodiments, other real time data streams may be used, and these streams may also be open-source.

As described above, persistence layer 440 may store both raw and enriched/encoded data. As a result, the system is more resilient to failures, as the data at various stages of its processing is persistently stored.

According to an example embodiment as described above, the separation of the reporting agent (or functionality) from the FM MS 420 allows for independent management of the reporting agent and the FM MS 420. Accordingly, core FM MS issues may not impact the Fault reporting MS (e.g., ongoing reporting and/or the retry mechanism). Further, resource limits can be independently applied, thereby, allowing an increase in retry count and/or duration limits or until events data is reported to the NBMS 410. Further, the separation of the core logic of FM MS 420 and the Fault reporting MS 430 not only provides for the added functionality of independently managing microservices with respect to high availability, load balancing, etc., it also provides an added benefit of providing fine grained control. Therefore, high availability and load balancing features will not mandate more IP addresses than needed, etc. Furthermore, situations where adding new or updating transport mechanism (e.g., O1 support, HTTP/REST, Kafka, SNMP, etc.) for northbound reporting involves updating only the Fault Reporting MS, with the FM MS left unchanged.

Figure 5:
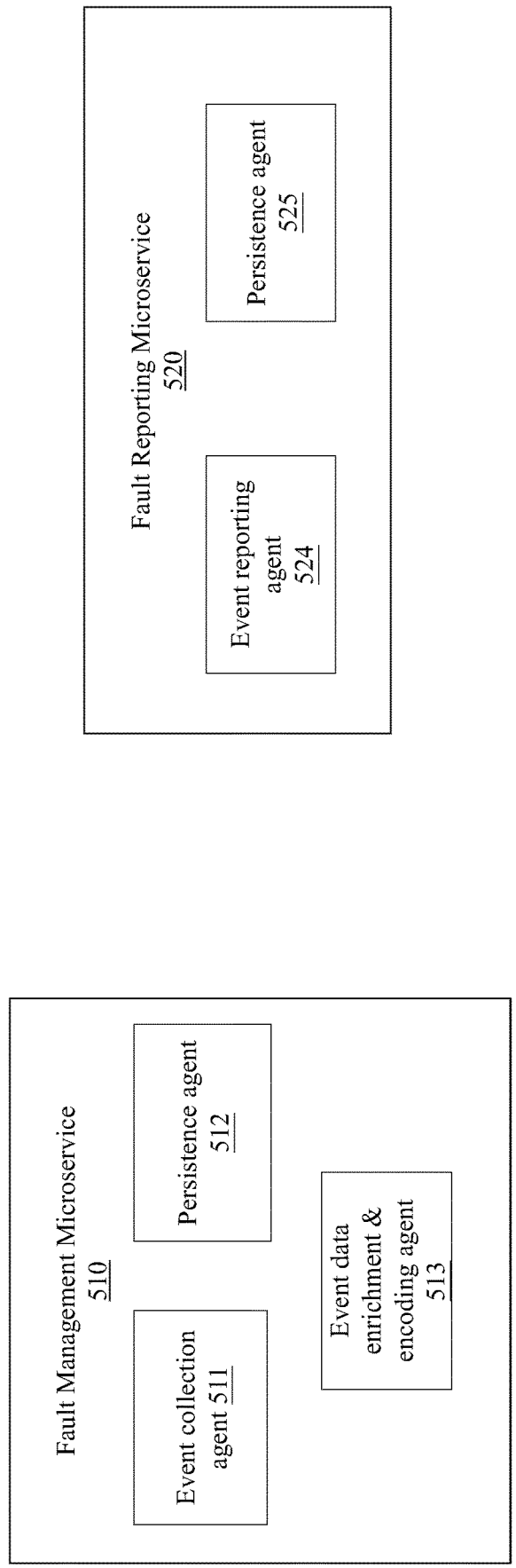
FIG. 5 is a block diagram of components of a FM microservice and Fault reporting microservice (MS), according to an embodiment.

FIG. 5 is a block diagram of components of an FM MS 510 and a Fault reporting MS 520, according to an example embodiment. Referring to FIG. 5, FM MS 510 may include: event collection agent 511 for receiving event data (e.g., fault-related event data) from subsystems (i.e., microservices) in the NF; persistence agent 512 for storing the received event data (in either or both of raw data form as received or enriched/encoded form as processed by the FM MS 510) in a persistence layer or storage; and event data enrichment & encoding agent 513 for enriching and encoding the received event data (raw data).

The Fault reporting MS 520 may include: persistence agent 525 for obtaining the enriched event data (enriched/encoded data as processed by the FM MS) from the persistence layer, and/or for storing data or information in the persistence layer (e.g. updating a status of enriched data stored in the persistence layer) and event reporting agent 524 for reporting the processed event data to the NBMS.

Figure 6:
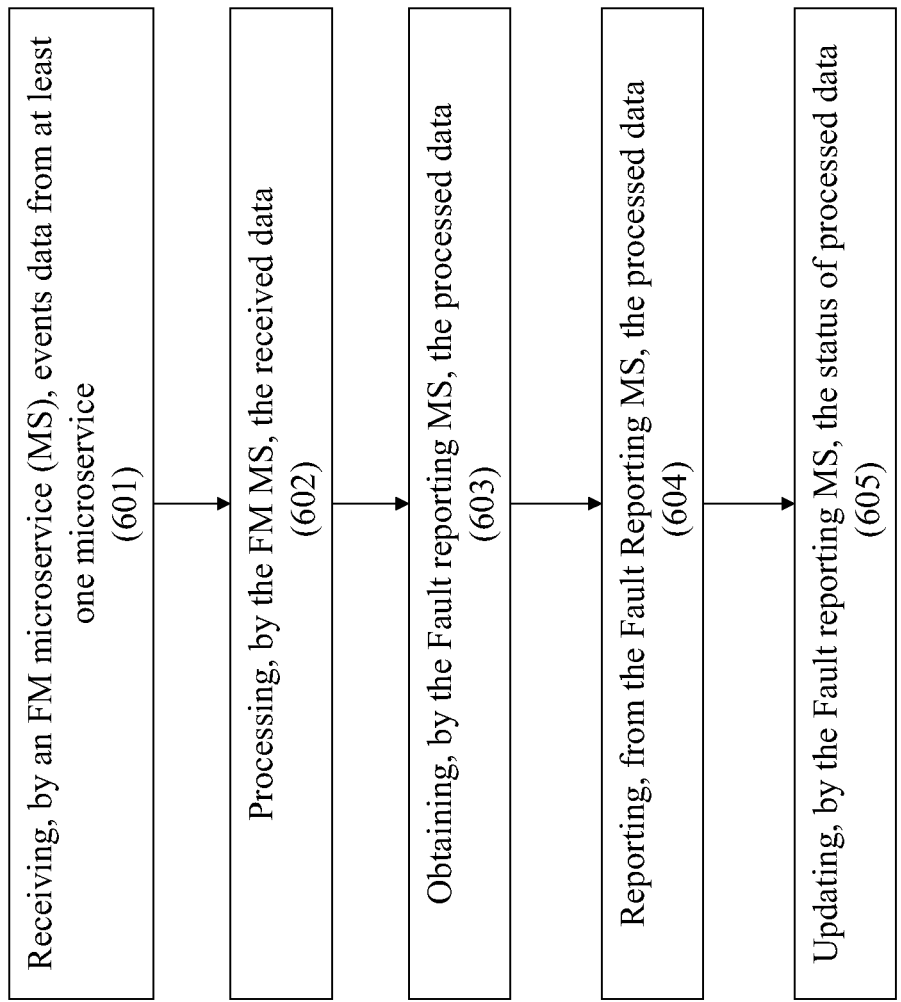
FIG. 6 is a flowchart of a method for optimal fault management reporting via NF level Northbound Fault reporting MS, according to an embodiment.

FIG. 6 is a flowchart of a method for optimal fault management reporting via NF level northbound Fault reporting MS, according to an embodiment. In FIG. 6, operations 601 and 602 are performed by FM MS and operations 603 through 605 are performed by Fault reporting MS (that incorporates a reporting functionality for the FM MS)

At operation 601, the FM MS receives events data (e.g., fault event, FM data, etc.) from at least one microservice 450-1, 450-2, ..., 450-n. According to one or more example embodiments, the received event data may be stored by the persistence agent of the FM MS in the persistence layer. The received data may include events data, e.g., faults, error conditions, etc.

At operation 602, the FM MS may process the received event data. For example, the FM MS may process (e.g., enrich, encode, etc.) the data based on certain prerequisite conditions and/or predefined logic.

At operation 603, the processed data is obtained by the Fault reporting MS. For example, when the processed data is ready to be reported to the NBMS, the processed data may be pushed or stored in the persistence layer or storage or may be transferred to the Fault reporting MS for reporting of the processed data to the NBMS. For example, the processed data may either be transferred to Fault reporting MS directly by FM MS or the Fault reporting MS may be signaled or notified by FM MS that the processed (e.g., encoded) data is stored in the persistence layer. In the latter case, the Fault reporting MS may request and/or retrieve the processed data from the persistence layer or storage.

At operation 604, the Fault reporting MS reports the processed data to the NBMS (e.g., via O1 interface, management interface, etc.). The reporting of processed data by the Fault reporting MS may also include updating the status of the processed data in the persistence layer or storage. For example, the Fault reporting MS may update the status in the persistence layer or storage that the processed data is in 'transit' or 'awaiting confirmation'.

At operation 605, upon receipt of a notification or acknowledgement (e.g., that the processed data has been received by NBMS) that may be sent by NBMS to the Fault reporting MS, the Fault reporting MS may update the status of the processed data in the persistence layer or storage. For example, the Fault reporting MS may change the status in the persistence layer or storage that the processed data is 'delivered to NBMS' or 'received by NBMS' or 'acknowledged by NBMS'.

Figure 7:
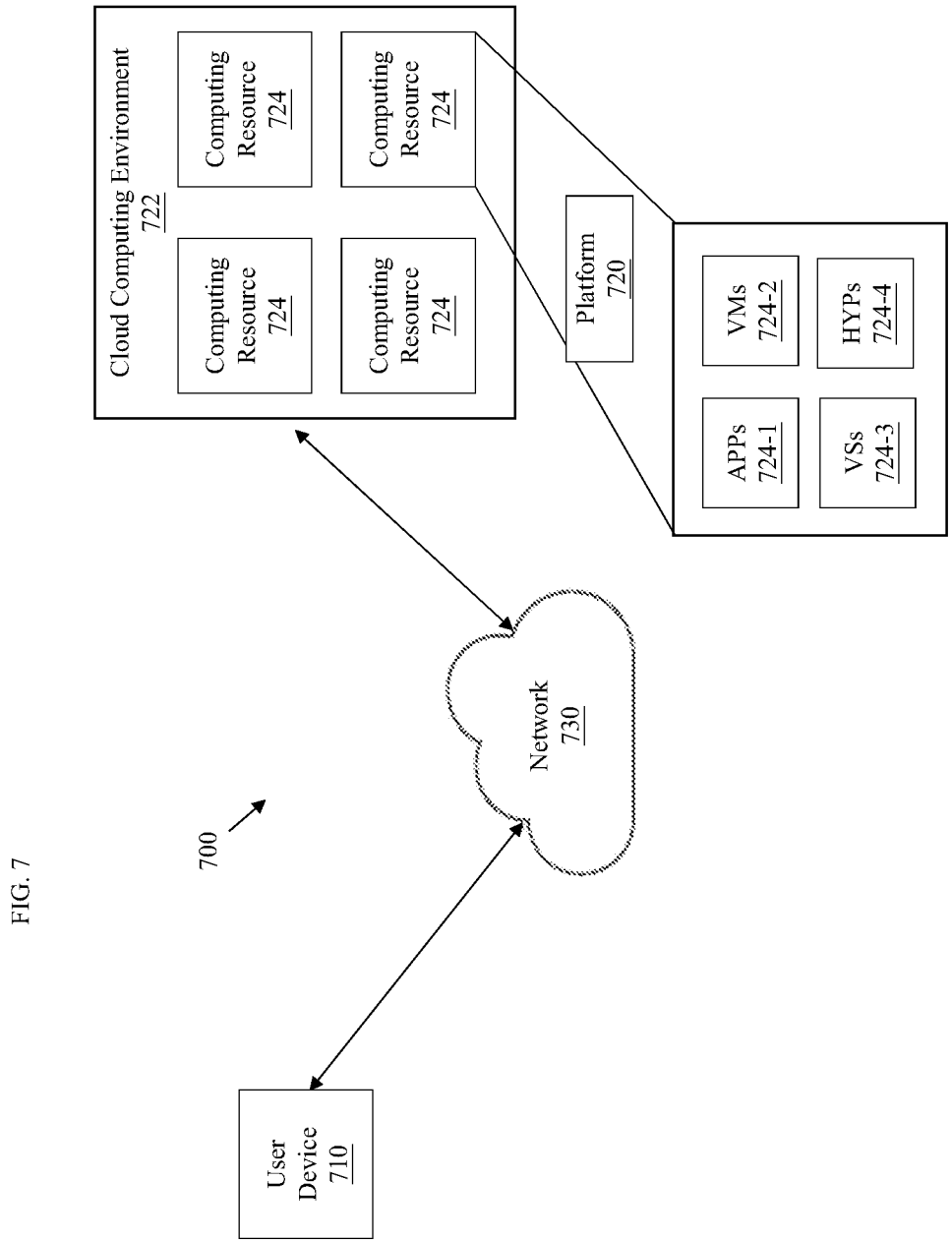
FIG. 7 is a diagram of an example environment in which systems and/or methods, described herein, may be implemented.

FIG. 7 is a diagram of an example environment 700 in which systems and/or methods, described herein, may be implemented. As shown in FIG. 7, environment 700 may include a user device 710, a platform 720, and a network 730. Devices of environment 700 may interconnect via wired connections, wireless connections, or a combination of wired and wireless connections. In embodiments, any of the functions and operations described with reference to FIGS. 4 through 6 above may be performed by any combination of elements illustrated in FIG. 7.

User device 710 includes one or more devices capable of receiving, generating, storing, processing, and/or providing information associated with platform 720. For example, user device 710 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 710 may receive information from and/or transmit information to platform 720.

Platform 720 includes one or more devices capable of receiving, generating, storing, processing, and/or providing information. In some implementations, platform 720 may include a cloud server or a group of cloud servers. In some implementations, platform 720 may be designed to be modular such that certain software components may be swapped in or out depending on a particular need. As such, platform 720 may be easily and/or quickly reconfigured for different uses.

In some implementations, as shown, platform 720 may be hosted in cloud computing environment 722. Notably, while implementations described herein describe platform 720 as being hosted in cloud computing environment 722, in some implementations, platform 720 may not be cloud-based (i.e., may be implemented outside of a cloud computing environment) or may be partially cloud-based.

Cloud computing environment 722 includes an environment that hosts platform 720. Cloud computing environment 722 may provide computation, software, data access, storage, etc., services that do not require end-user (e.g., user device 710) knowledge of a physical location and configuration of system(s) and/or device(s) that hosts platform 720. As shown, cloud computing environment 722 may include a group of computing resources 724 (referred to collectively as "computing resources 724" and individually as "computing resource 724").

Computing resource 724 includes one or more personal computers, a cluster of computing devices, workstation computers, server devices, or other types of computation and/or communication devices. In some implementations, computing resource 724 may host platform 720. The cloud resources may include compute instances executing in computing resource 724, storage devices provided in computing resource 724, data transfer devices provided by computing resource 724, etc. In some implementations, computing resource 724 may communicate with other computing resources 724 via wired connections, wireless connections, or a combination of wired and wireless connections.

As further shown in FIG. 7, computing resource 724 includes a group of cloud resources, such as one or more applications ("APPs") 724-1, one or more virtual machines ("VMs") 724-2, virtualized storage ("VSs") 724-3, one or more hypervisors ("HYPs") 724-4, or the like.

Application 724-1 includes one or more software applications that may be provided to or accessed by user device 710. Application 724-1 may eliminate a need to install and execute the software applications on user device 710. For example, application 724-1 may include software associated with platform 720 and/or any other software capable of being provided via cloud computing environment 722. In some implementations, one application 724-1 may send/receive information to/from one or more other applications 724-1, via virtual machine 724-2.

Virtual machine 724-2 includes a software implementation of a machine (e.g., a computer) that executes programs like a physical machine. Virtual machine 724-2 may be either a system virtual machine or a process virtual machine, depending upon use and degree of correspondence to any real machine by virtual machine 724-2. A system virtual machine may provide a complete system platform that supports execution of a complete operating system ("OS"). A process virtual machine may execute a single program, and may support a single process. In some implementations, virtual machine 724-2 may execute on behalf of a user (e.g., user device 710), and may manage infrastructure of cloud computing environment 722, such as data management, synchronization, or long-duration data transfers.

Virtualized storage 724-3 includes one or more storage systems and/or one or more devices that use virtualization techniques within the storage systems or devices of computing resource 724. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 724-4 may provide hardware virtualization techniques that allow multiple operating systems (e.g., "guest operating systems") to execute concurrently on a host computer, such as computing resource 724. Hypervisor 724-4 may present a virtual operating platform to the guest operating systems, and may manage the execution of the guest operating systems. Multiple instances of a variety of operating systems may share virtualized hardware resources.

Network 730 includes one or more wired and/or wireless networks. For example, network 730 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 7 are provided as an example. In practice, there may be additional devices and/or networks, fewer devices and/or networks, different devices and/or networks, or differently arranged devices and/or networks than those shown in FIG. 7. Furthermore, two or more devices shown in FIG. 7 may be implemented within a single device, or a single device shown in FIG. 7 may be implemented as multiple, distributed devices. Additionally, or alternatively, a set of devices (e.g., one or more devices) of environment 700 may perform one or more functions described as being performed by another set of devices of environment 700.

Figure 8:
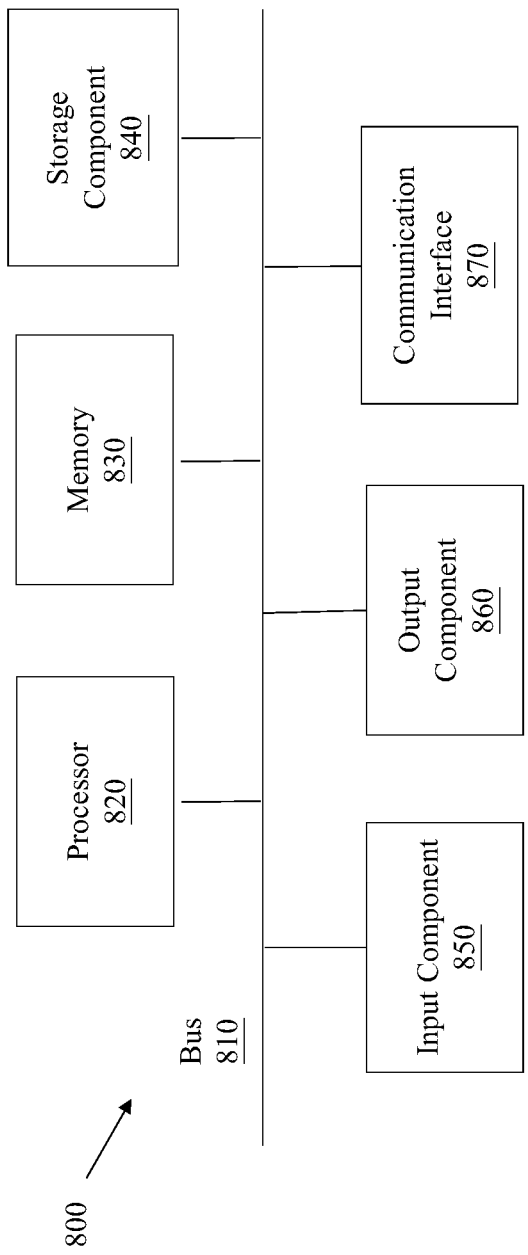
FIG. 8 is a diagram of example components of a device according to an embodiment.

FIG. 8 is a diagram of example components of a device 800. Device 800 may correspond to user device 710 and/or platform 720. As shown in FIG. 8, device 800 may include a bus 810, a processor 820, a memory 830, a storage component 840, an input component 850, an output component 860, and a communication interface 870.

Bus 810 includes a component that permits communication among the components of device 800. Processor 820 may be implemented in hardware, firmware, or a combination of hardware and software. Processor 820 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 820 includes one or more processors capable of being programmed to perform a function. Memory 830 includes a random access memory (RAM), a read only memory (ROM), and/or another type of dynamic or static storage device (e.g., a flash memory, a magnetic memory, and/or an optical memory) that stores information and/or instructions for use by processor 820.

Storage component 840 stores information and/or software related to the operation and use of device 800. For example, storage component 840 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 850 includes a component that permits device 800 to receive information, such as via user input (e.g., a touch screen display, a keyboard, a keypad, a mouse, a button, a switch, and/or a microphone). Additionally, or alternatively, input component 850 may include a sensor for sensing information (e.g., a global positioning system (GPS) component, an accelerometer, a gyroscope, and/or an actuator). Output component 860 includes a component that provides output information from device 800 (e.g., a display, a speaker, and/or one or more light-emitting diodes (LEDs)).

Communication interface 870 includes a transceiver-like component (e.g., a transceiver and/or a separate receiver and transmitter) that enables device 800 to communicate with other devices, such as via a wired connection, a wireless connection, or a combination of wired and wireless connections. Communication interface 870 may permit device 800 to receive information from another device and/or provide information to another device. For example, communication interface 870 may include an Ethernet interface, an optical interface, a coaxial interface, an infrared interface, a radio frequency (RF) interface, a universal serial bus (USB) interface, a Wi-Fi interface, a cellular network interface, or the like.

Device 800 may perform one or more processes described herein. Device 800 may perform these processes in response to processor 820 executing software instructions stored by a non-transitory computer-readable medium, such as memory 830 and/or storage component 840. A computer-readable medium is defined herein as a non-transitory memory device. A memory device includes memory space within a single physical storage device or memory space spread across multiple physical storage devices.

Software instructions may be read into memory 830 and/or storage component 840 from another computer-readable medium or from another device via communication interface 870. When executed, software instructions stored in memory 830 and/or storage component 840 may cause processor 820 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 8 are provided as an example. In practice, device 800 may include additional components, fewer components, different components, or differently arranged components than those shown in FIG. 8. Additionally, or alternatively, a set of components (e.g., one or more components) of device 800 may perform one or more functions described as being performed by another set of components of device 800.

In embodiments, any one of the operations or processes of FIGS. 4 through 6 may be implemented by or using any one of the elements illustrated in FIGS. 7 and 8. It is understood that other embodiments are not limited thereto, and may be implemented in a variety of different architectures (e.g., bare metal architecture, any cloud-based architecture or deployment architecture such as Kubernetes, Docker, OpenStack, etc.).

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a microservice(s), module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A method of reporting data to a Northbound Management System (NBMS) via a Network Function (NF) level northbound Fault reporting Microservice (MS) in an NF of a Radio Access Network (RAN), performed by at least one processor implementing the NF, the method comprising:
   receiving, by a Fault Management (FM) MS from at least one other MS of the NF, event data;
   processing, by the FM MS, the event data;
   obtaining, by the Fault reporting MS which is independent of the FM MS, the processed event data; and
   reporting, from the Fault reporting MS to the NBMS, the processed event data,
   wherein the FM MS and the Fault reporting MS are independent NF level microservices in a gNB of the RAN.

2. The method of claim 1, further comprising:
   storing, by the FM MS, the received event data in a persistent storage.

3. The method of claim 1, further comprising:
   storing, by the FM MS, the processed event data in a persistent storage,
   wherein the obtaining the processed event data comprises obtaining, by the Fault reporting MS, the processed event data received from the FM MS or read from the persistent storage.

4. The method of claim 1, wherein the processing comprises:
   enriching and/or encoding, by the FM MS, the received event data.

5. The method of claim 1, further comprising:
   updating, by the Fault reporting MS, a northbound reporting status of the processed event data.

6. The method of claim 1, wherein the event data comprises information on at least one fault or error event.

7. The method of claim 1, further comprising:
   updating, by the Fault reporting MS, a northbound reporting status of the processed event data after reporting the processed event data to the NBMS, and
   updating, by the Fault reporting MS, the northbound reporting status of the processed event data, based on receipt of acknowledgement from the NBMS.

8. A system for reporting data to a Northbound Management System (NBMS) via a Network Function (NF) level Northbound Fault reporting Microservice (MS) in an NF of a RAN, the system comprising:
   at least one memory storing instructions; and
   at least one processor configured to execute the instructions to:
   receive, by a Fault Management (FM) MS from at least one other MS of the NF, event data;
   process, by the FM MS, the event data,
   obtain, by the Fault reporting MS which is independent of the FM MS, the processed event data; and
   report, from the Fault reporting MS to the NBMS, the processed event data,
   wherein the FM MS and the Fault reporting MS are independent NF level microservices in a gNB of the RAN.

9. The system of claim 8, wherein the at least one processor is further configured to execute the instructions to:

store, by the FM MS, the received event data in a persistent storage.

10. The system of claim 8, wherein the at least one processor is further configured to execute the instructions to:
store, by the FM MS, the processed event data in a persistent storage; and
obtain, by the Fault reporting MS, the processed event data received from the FM MS or read from the persistent storage.

11. The system of claim 8, wherein the at least one processor is further configured to execute the instructions to process the received event data by enriching and/or encoding the received event data.

12. The system of claim 8, wherein the at least one processor is further configured to execute the instructions to:
update, by the Fault reporting MS, a northbound reporting status of the processed event data.

13. The system of claim 8, wherein the event data comprises information on at least one fault or error event.

14. The system of claim 8, wherein the at least one processor is further configured to execute the instructions to:
update, by the Fault reporting MS, a northbound reporting status of the processed event data after reporting the processed event data to the NBMS, and
update, by the Fault reporting MS, the northbound reporting status of the processed event data, based on receipt of acknowledgement from the NBMS.

15. A non-transitory computer-readable recording medium having recorded thereon instructions executable by at least one processor to perform a method for reporting data to a Northbound Management System (NBMS) via a Network Function (NF) level Fault reporting MS in an NF of a RAN, the method comprising:
receiving, by a Fault Management (FM) MS from at least one other MS of the NF, event data;
processing, by the FM MS, the event data;
obtaining, by the Fault reporting MS which is independent of the FM MS, the processed event data; and
reporting, from the Fault reporting MS to the NBMS, the processed event data,
wherein the FM MS and the Fault reporting MS are independent NF level microservices in a gNB of the RAN.

16. The non-transitory computer-readable recording medium of claim 15, wherein the method further comprises:
storing, by the FM MS, the received event data in a persistent storage; and
storing, by the FM MS, the processed event data in the persistent storage.

17. The non-transitory computer-readable recording medium of claim 15, wherein the processing comprises:
enriching and/or encoding, by the FM MS, the received event data.

18. The non-transitory computer-readable recording medium of claim 15, wherein the method further comprises:
updating, by the Fault reporting MS, a northbound reporting status of the processed event data.

19. The non-transitory computer-readable recording medium of claim 15, wherein the event data comprises information on at least one fault or error event.

20. The non-transitory computer-readable recording medium of claim 15, wherein the method further comprises:
updating, by the Fault reporting MS, a northbound reporting status of the processed event data after reporting the processed event data to the NBMS, and
updating, by the Fault reporting MS, the northbound reporting status of the processed event data based on receipt of acknowledgement from the NBMS.

* * * * *